(12) United States Patent
Odaohhara

(10) Patent No.: US 8,729,868 B2
(45) Date of Patent: May 20, 2014

(54) METHOD AND APPARATUS FOR CHARGING BATTERIES

(75) Inventor: Shigefumi Odaohhara, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1257 days.

(21) Appl. No.: 12/141,974

(22) Filed: Jun. 19, 2008

(65) Prior Publication Data

US 2009/0027013 A1    Jan. 29, 2009

(30) Foreign Application Priority Data

Jul. 27, 2007 (JP) ................................. 2007-195648

(51) Int. Cl.
*H02J 7/06* (2006.01)
(52) U.S. Cl.
USPC ............................ 320/164; 320/134; 320/160
(58) Field of Classification Search
USPC .................................. 320/114, 134, 160, 164
See application file for complete search history.

(56) References Cited

U.S. PATENT DOCUMENTS

| | | | | |
|---|---|---|---|---|
| 5,465,039 | A * | 11/1995 | Narita et al. ................... | 320/164 |
| 5,710,506 | A * | 1/1998 | Broell et al. ................... | 320/145 |
| 6,452,364 | B1 * | 9/2002 | Saeki et al. .................... | 320/137 |
| 2001/0054878 | A1 | 12/2001 | Odaohhara | |
| 2005/0068006 | A1 | 3/2005 | Matsunaga | |
| 2005/0253560 | A1 | 11/2005 | Popescu-Stanesti et al. | |

FOREIGN PATENT DOCUMENTS

| | | |
|---|---|---|
| CN | 1204177 | 1/1999 |
| JP | PUUMAS59-085050 | 1/1984 |
| JP | 05111189 | 4/1993 |
| JP | 09223721 | 8/1997 |
| JP | 2001-268813 | 9/2001 |
| JP | 2002-359936 | 12/2002 |
| JP | 2004-140953 | 5/2004 |
| JP | 2004-320865 | 11/2004 |
| JP | 2007-097397 | 4/2007 |
| TW | 587359 | 5/2004 |

\* cited by examiner

*Primary Examiner* — Edward Tso
*Assistant Examiner* — Aaron Piggush
(74) *Attorney, Agent, or Firm* — Antony P. Ng; Yudell Isidore Ng Russell PLLC

(57) ABSTRACT

A battery charging system is disclosed. The battery charging system includes a battery charger, a switching circuit and a control circuit. The battery charger receives electric power from a DC power supply and charges a rechargeable battery based on a setting current. The switching circuit is capable of switching between a first charging mode and a second charging mode. In the first charging mode, the battery charger charges the rechargeable battery while the DC power supply is supplying electric power to the battery charger in a state where the DC power supply is able to supply electric power to a load. In the second charging mode, the DC power supply charges the rechargeable battery in a state where the DC power supply is able to supply electric power to the load. The control circuit controls the switching circuit based on a comparison result of the magnitude of a charging current (or a charging power) in the first charging mode and the magnitude of a charging current (or a charging power) in the second charging mode.

11 Claims, 5 Drawing Sheets

METHOD AND APPARATUS FOR CHARGING BATTERIES

PRIORITY CLAIM

The present application claims benefit of priority under 35 U.S.C. §§120, 365 to the previously filed Japanese Patent Application No. JP2007-195648 entitled, "Charging System and Charging Method" with a priority date of Jul. 27, 2007, which is incorporated by reference herein.

BACKGROUND OF THE INVENTION

1. Technical Field

The present invention relates to battery chargers in general, and in particular to a method for reducing charging time of a battery having a charging rate greater than the capacity of a battery charger.

2. Description of Related Art

Lithium ion rechargeable batteries can be found in many portable electronic devices such as notebook personal computers (PCs). Although lithium ion rechargeable batteries have high energy density, the charging time of lithium ion rechargeable batteries tend to be long. In recent years, a fast charge type lithium ion rechargeable battery that employs nano-sized particles as negative-electrode material has been developed and begun to appear on the market. A normal charge type lithium ion rechargeable battery has a charging rate of about 0.7 C. In contrast, a fast charge type lithium ion rechargeable battery has a charging rate of about 2 C. As a result, the charging time for a fast charge type lithium ion rechargeable battery is much shorter than the charging time for a normal charge type lithium ion rechargeable battery.

When a fast charge type lithium ion rechargeable battery is charged by a battery charger having a capacity capable of charging normal charge type lithium ion rechargeable batteries, the fast charge type lithium ion rechargeable battery cannot perform up to its full capability because of the insufficient charging capacity. For example, a fast charge type lithium ion rechargeable battery can be charged up to 80% of its full charge capacity within 30 minutes by a battery charger having a capacity suitable for its charging rate. However, when the fast charge type lithium ion rechargeable battery is charged by a battery charger adapted for normal charge type lithium ion rechargeable batteries, the fast charge type lithium ion rechargeable battery may take 75 minutes to be charged to the same capacity.

Typically, it is desirable for a notebook PC to be charged to as much capacity as possible within a short time after usage in a mobile environment so that it can be prepared for later mobile use. It is also expected that the fast charge type lithium ion rechargeable battery would be gradually employed in future notebook PCs. However, when the capacity of a battery charger mounted within a notebook PC is increased in order to be able to handle the fast charge type lithium ion rechargeable battery, the battery charger becomes bulky, which may cause problems such as reducing inner space of the notebook PC, increasing heat generation and increasing cost.

SUMMARY OF THE INVENTION

In accordance with a preferred embodiment of the present invention, a battery charging system includes a battery charger, a switching circuit and a control circuit. The battery charger receives electric power from a DC power supply and charges a rechargeable battery based on a setting current. The switching circuit is capable of switching between a first charging mode and a second charging mode. In the first charging mode, the battery charger charges the rechargeable battery while the DC power supply is supplying electric power to the battery charger in a state where the DC power supply is able to supply electric power to a load. In the second charging mode, the DC power supply charges the rechargeable battery in a state where the DC power supply is able to supply electric power to the load. The control circuit controls the switching circuit based on a comparison result of the magnitude of a charging current (or a charging power) in the first charging mode and the magnitude of a charging current (or a charging power) in the second charging mode.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
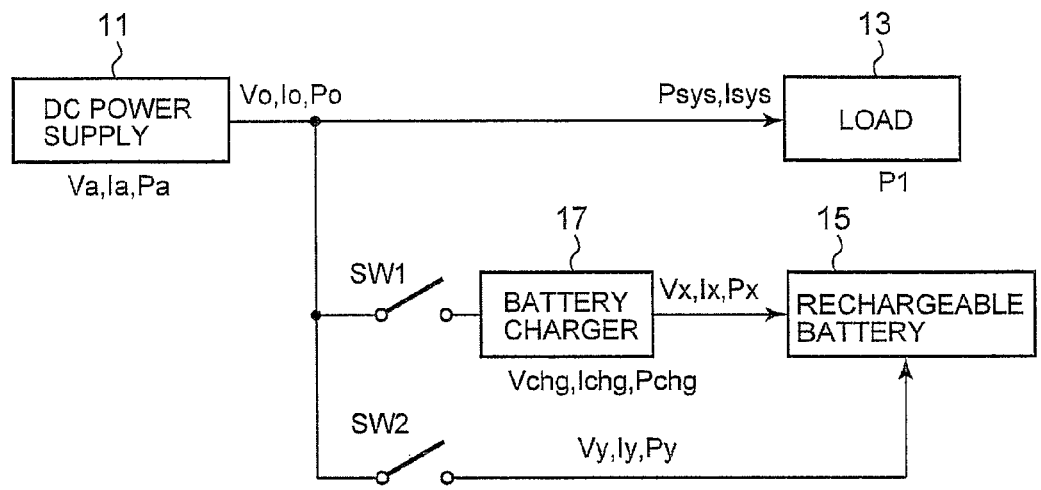
FIGS. 1A and 1B are diagrams for explaining the basic construction and operation of a battery charging system, according to an embodiment of the present invention.

FIG. 1A is a block diagram illustrating a basic construction of a battery charging system, according to an embodiment of the present invention. The battery charging system has two charging modes: a first charging mode wherein charging is performed by means of a battery charger 17 and a second charging mode wherein charging is performed by means of a DC power supply 11. In FIG. 1A, the DC power supply 11 is a voltage converter that converts an AC voltage or a DC voltage into a predetermined DC voltage. The DC power supply 11 is able to supply electric power to the battery charger 17 by opening a switch SW2 and closing a switch SW1 while supplying electric power to a system load 13. The DC power supply 11 is also able to directly charge the rechargeable battery 15 by opening the switch SW1 and closing the switch SW2 while supplying electric power to the system load 13.

Figure 1B:
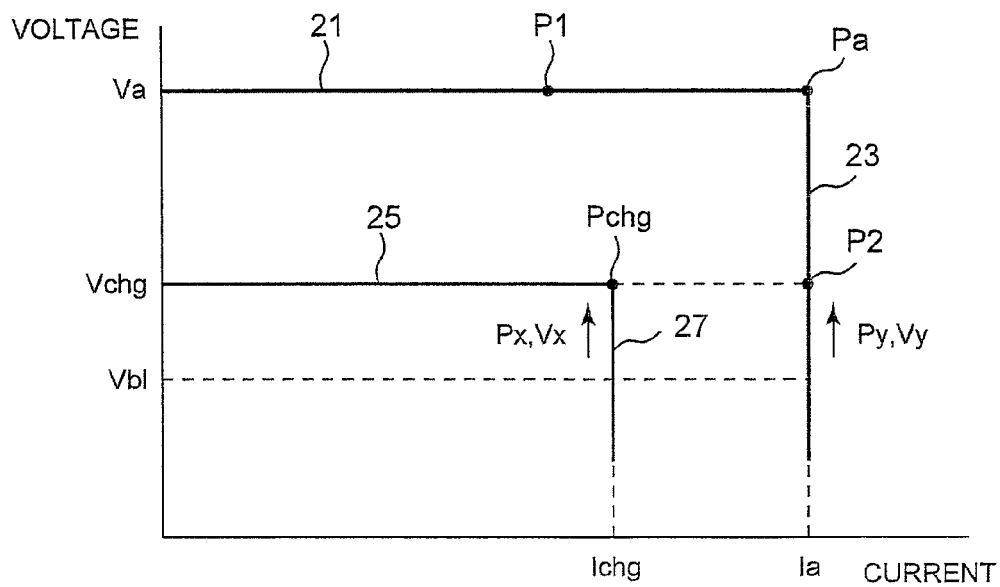

FIG. 1B is a chart illustrating the voltage-current characteristics of a battery charger 17 and a DC power supply 11. The DC power supply 11 has constant-current/constant-voltage characteristics that it operates in both a constant voltage region 21 and a constant current region 23. That is, the DC power supply 11 operates in the constant current region 23 to control an output voltage Vo such that an output current Io is identical to a rated current Ia in cases such as when a large load is connected thereto so that the output current Io exceeds the rated current Ia or when an accident such as short-circuit or over-current occurs at the output side. Meanwhile, the DC power supply 11 operates in the constant voltage region 21 to control the output voltage Vo so as to be identical to a rated voltage Va in cases such as when the output current Io is smaller than the rated current Ia. The DC power supply 11 has a rated power Pa, which amounts to Va×Ia. The rated current Ia in the constant current region 23 of the DC power supply 11 is set such that it is larger than a setting voltage Ichg of the battery charger 17 and is equal to or smaller than the charging rate of the rechargeable battery 15.

The rechargeable battery 15 is a fast charge type lithium ion rechargeable battery and is charged in a constant-current/constant-voltage charging method. In the constant-current/constant-voltage charging method, during a normal constant current charging period, charging is performed with a constant current that is defined by the charging rate of the rechargeable battery, and once the charging voltage increases to a predetermined value, the control proceeds to a constant voltage charging period. During the constant voltage charging period, the charging is performed with a constant voltage until the charging current decreases to a predetermined value. When charging is performed in the constant-current/constant-voltage charging method, it is preferable to charge with the charging current in the constant current charging period set to the charging rate of the rechargeable battery from the viewpoint of degradation or charging time of the rechargeable battery. However, the charging may be performed with a current smaller than the charging rate. Moreover, as long as the charging current is maintained at a value smaller than the charging rate, the charging current may vary with the progress of the charging. However, as the charging current decreases, the charging time becomes longer. The charging voltage in the constant voltage charging period may cause a safety problem and therefore requires strict management.

The rechargeable battery 15 has a charging rate as high as 2 C since it is a fast charge type, and is thus capable of being charged in short time with a charging current during the constant current charging period larger than that of a normal type. Here, the unit C of the charging rate means a current value having the same value as a capacity: for example, when the charging rate of a rechargeable battery having a capacity of 1000 mAh is 1 C, the charging current is 1 A, while the charging current is 2 A when the charging rate is 2 C. The rechargeable battery 15 is adapted to be able to supply electric power to the system load 13 while the DC power supply 11 is not operating. In FIG. 1A, a discharge path extending from the rechargeable battery 15 to the system load 13 is not illustrated.

Since the charging rate of the normal charge type lithium ion rechargeable battery is about 0.7 C, the fast charge type rechargeable battery 15 is able to charge with a charge current three times greater than that of the normal charge type rechargeable battery having the same capacity. In order for the fast charge type rechargeable battery to be able to perform its full capability and be charged in a short time, the battery charger needs to have capability to charge with the charging rate of the rechargeable battery 15. However, the battery charger 17 is adapted to charge the normal charge type rechargeable battery and is thus not capable of charging the rechargeable battery 15 with a charging rate of 2 C.

Therefore, when a charging mode wherein charging is performed by means of the battery charger 17 is employed in the constant current charging period, since it is impossible to supply a sufficient charging current to the rechargeable battery 15, the rechargeable battery 15 cannot perform the fast charging capability. The battery charger 17 has constant-current/constant-voltage characteristics that it operates in both a constant voltage region 25 and a constant current region 27. That is, the battery charger 17 operates in the constant current region 27 to control a charging voltage Vx such that a charging current Ix is identical to a setting current Ichg when the charging current Ix is large. Meanwhile, the battery charger 17 operates in the constant voltage region 25 to thereby control the charging voltage Vx so as to be identical to a setting voltage Vchg when the charging voltage Vx becomes high.

When the DC power supply 11 is operating in the constant voltage region 21 and is supplying the rated voltage Va to the battery charger 17, a rated power Pchg, which is the maximum power that the battery charger 17 charges the rechargeable battery 15 amounts to Vchg×Ichg. When the battery charger 17 starts charging the rechargeable battery 15 which is sufficiently discharged, the setting current Ichg that is set in accordance with the charging rate of the rechargeable battery 15 flows in the battery charger 17, and the charging voltage Vx of the rechargeable battery 15 in the constant current region 27 gradually increases from a charge start voltage Vb1 and eventually reaches the setting voltage Vchg of the battery charger 17. Since the charging current Ix in the constant current region 27 is the same as the setting voltage Ichg, the charging power Px when the battery charger 17 is charging the rechargeable battery 15 amounts to Vx×Ichg; therefore, the charging power Px increases with the lapse of charging time.

The charge start voltage Vb1 is the minimum voltage of the rechargeable battery 15 when starting constant current charging while suppressing degradation of the rechargeable battery 15. When the battery voltage is equal to or smaller than the charge start voltage Vb1, the battery charger 17 is preliminarily operated in the constant voltage region 25 to thereby perform trickle charging so that the battery voltage is recovered. During the trickle charging, the DC power supply 11 operates in the constant voltage region 21.

The load 13 is an electric apparatus or an electronic device that is operated by being supplied with electric power from the DC power supply 11. In this charging system, when the DC power supply 11 is operating in the constant voltage region 21, the maximum power consumption P1 of the load 13, the rated output Pchg of the battery charger 17, and the rated output Pa of the DC power supply 11 are selected so as to satisfy the relationship of Pa−P1>Pchg. The efficiency of the battery charger 17 is usually 95% or more, and therefore, the efficiency will be regarded as being 100% for the simplicity sake. That is, when the battery charger 17 is charging the rechargeable battery 15 with the rated output Pchg, the DC power supply 11 operates in the constant voltage region 21 and is thus able to supply the maximum consumption power P1 to the load 13. In this charging system, the power consumption of the load 13 can freely vary between 0 to P1 regardless of the operation of the charging system.

Next, the operation of the charging system will be described. In this charging system, during the constant current charging period of the rechargeable battery 15, when the power consumption of the load 13 is zero or equal to or smaller than a predetermined value, the rechargeable battery 15 is directly charged by means of the DC power supply 11 by opening the switch SW1 and closing the switch SW2. Since the charging rate of the rechargeable battery 15 is high, when the rechargeable battery 15 is charged by means of the DC power supply 11, the DC power supply 11 operates in the constant current region 23, and the charging voltage Vy of the rechargeable battery 15 gradually increases from the charge start voltage Vb1 and eventually reaches the setting voltage Vchg.

The charging voltage Vy, the charging power Py, and the charging current Iy when the rechargeable battery 15 is charged by means of DC power supply 11 are measurable by the charging system in a well-known method. Since the charging current Iy when the DC power supply 11 is charging the rechargeable battery 15 in the constant current region 23 is the same as the rated current Ia, the charging power Py is Py=Vy×Ia. When the DC power supply 11 operates in the constant current region 23 and is not supplying electric power to the load 13, the rechargeable battery 15 is charged with the charging power Py, which amounts to Vy×Ia. At this time, since the charging current Iy is equal to or smaller than the charging rate of the rechargeable battery 15, the charging can be performed by means of the DC power supply 11 in a safe manner.

As described above, the charging power Px when the rechargeable battery 15 is charged by means of the battery charger 17 is Vx×Ichg. Here, the charging voltage Vx of the battery charger 17 to the rechargeable battery 15 can be thought as being the same as the charging voltage Vy of the DC power supply 11 to the rechargeable battery 15, and Ia>Ichg; therefore, a relation of Py≥Px is satisfied. Therefore, when the rechargeable battery 15 is charged by means of the DC power supply 11, the charging time can be reduced compared with the case of charging the rechargeable battery 15 by means of the battery charger 17. A lithium ion rechargeable battery requires precise voltage control during the constant voltage charging period. In the charging system according to the present invention, when the charging voltage Vy reaches the setting voltage Vchg, the battery charger 17 charges the rechargeable battery 15 in the constant voltage region 25 by turning off the switch SW2 and turning on the switch SW1. Therefore, the rechargeable battery 15 can be charged in the remaining charging period in a safe manner.

The DC power supply 11 needs to supply a load power Psy to the load 13 while it is charging the rechargeable battery 15 in the constant current region 23. At this time, the charging voltage Vy is supplied to the load 13. In this charging system, when the charging voltage Vy of the rechargeable battery 15 increases and reaches the setting voltage Vchg, the charging voltage Vy is controlled so as not to exceed the setting voltage Vchg of the battery charger 17 by opening the switch SW2 and closing the switch SW1. Therefore, the maximum output P2 of the DC power supply 11 when the DC power supply 11 is charging the rechargeable battery 15 in the constant current region 23 is Vchg×Ia. Since the output Po of the DC power supply 11 before the charging voltage Vy reaches the setting voltage Vchg is distributed to the consumption power Psys of the load 13 and the charging power Py of the rechargeable battery 15, a relation of Po=Psys+Py<P2 is satisfied.

The ratio of the consumption power Psys to the charging power Py is inversely proportional to the equivalent resistance of the load 13 and the rechargeable battery 15 as viewed from the output terminal of the DC power supply 11. Therefore, when the consumption power Psys increase and the equivalent resistance of the load 13 decreases, the output Po of the DC power supply 11 is distributed more to the system load 13. As a result, the charging power Py decreases, and therefore, the battery charger 17 can provide larger charging power than that provided by the DC power supply 11. The reason is that when charging is performed by means of the rechargeable battery 17, since Pa>P1+Pchg, the DC power supply 11 operates in the constant voltage region 21 and the output voltage Vo becomes the rated voltage Va, whereby the battery charger 17 becomes able to supply a charging power Px larger than that supplied by the DC power supply 11.

To determine a charging mode during the constant current charging period of the rechargeable battery 15 based on a simple determination as to the superiority concerning the charging time between the charging mode by the DC power supply 11 and the charging mode by the battery charger 17, when the condition of formula (1) is satisfied, charging is performed by means of the battery charger 17, while when condition of formula (2) is satisfied, charging is performed by means of the DC power supply 11.

$$Py<Px \quad (1)$$

$$Py=Px \quad (2)$$

When charging is performed by means of the battery charger 17, the charging power Py for the case where charging is performed by means of the DC power supply 11 can be measured by temporarily switching to a charging mode by the DC power supply 11 by operating the switches SW1 and SW2. However, the determination based on the formulas (1) and (2) may complicate the circuit since it is necessary to monitor the charging powers Px and Py at all times to determine the superiority. Therefore, instead of this, the charging mode may be simply determined by the following method.

In practicing the present invention, since the charging power Px when charging is performed by means of the battery charger 17 can be thought as being the same as the rated output Pchg of the battery charger 17, the formulas (1) and (2) can be modified to formulas (3) and (4), respectively, as follows:

$$Py<Pchg \quad (3)$$

$$Py \geq Pchg \quad (4)$$

Therefore, when the charging power Py for the case where charging is performed by means of the DC power supply 11 is smaller than the rated output Pchg of the battery charger 17, charging is performed by means of the battery charger 17, while in the opposite case, charging is performed by means of the DC power supply 11.

Moreover, since the output Po of the DC power supply 11 during charging can be thought as being the same as the maximum output P2 of the DC power supply 11 during charging, the formula (3) which needs to be satisfied when charging with the battery charger 17 can be modified to formula (7).

$$Po=Psys+Py \quad (5)$$

$$Po-Psys<Pchg \quad (6)$$

$$P2-Pchg<Psys \quad (7)$$

In addition, from the formula (7), it is possible to derive the condition when charging is performed by means of the DC power supply 11, as specified by formula (8).

$$P2-Pchg \geq Psys \quad (8)$$

According to the formulas (7) and (8), since P2=Vchg×Ia, the determination as to the superiority can be made based on the comparison results of the load power consumption Psys and a threshold value calculated from the setting voltage Vchg of the battery charger 17, the rated current Ia of the DC power supply 11, and the rated output Pchg of the battery charger 17. Therefore, the circuit for determining the charging mode can be constructed in a simple structure. Moreover, in the formulas (3) and (4), in order to measure the charging power Py for the case where charging is performed by means of the DC power supply 11 while the charging is performed by means of the battery charger 17, it is necessary to switch on/off the switches SW1 and SW2. To the contrary, in the formulas (7) and (8), since the power consumption Psys of the load 13 can be measures in either charging mode, such a switching operation is not necessary.

When the switch SW2 is open and the switch SW1 is closed when the charging power Py satisfies a relation of Py<Px, the battery charger 17 operates in the constant current region 27 to start charging the rechargeable battery 15 with the setting current Ichg. As described above, in this charging system, since the rated power Pchg of the battery charger 17, the maximum power consumption P1 of the load 13, and the rated output Pa of the DC power supply 11 are selected so as to satisfy the relationship of Pa>Pchg+P1, the DC power supply 11 transitions from charging in the constant current region 23 to charging in the constant voltage region 21 to thereby supply the rated voltage Va to the battery charger 17. Since the battery charger 17 is able to charge the rechargeable battery 17 with the charging power Px upon receipt of the rated voltage Va from the DC power supply 11, it can provide larger charging power than the charging power Py provided by the DC power supply 11 as long as Py<Px. When the charging voltage Vx has reached the setting voltage Vchg, the battery charger 17 transitions to the constant voltage region 25, where it continues to charge the rechargeable battery 15.

As described above, in the present embodiment, when the fast charge type rechargeable battery 15 is charged by means of the normal charge type battery charger 17, the charging during the constant current charging period of the rechargeable battery 15 is performed either one of the DC power supply 11 or the battery charger 17 in accordance with the consumption power Psys of the load 13, while the charging during the constant voltage charging period is performed by means of the battery charger 17. In the description above, in order to select the charging mode, the consumption power Psys of the load 13 and the charging power Py of the DC power supply 11 were measured; however, the present invention may be modified in such a manner that the superiority is determined based on the load current flowing through the load 13 or the charging current Iy when charging is performed by means of the DC power supply 11.

Figure 2:
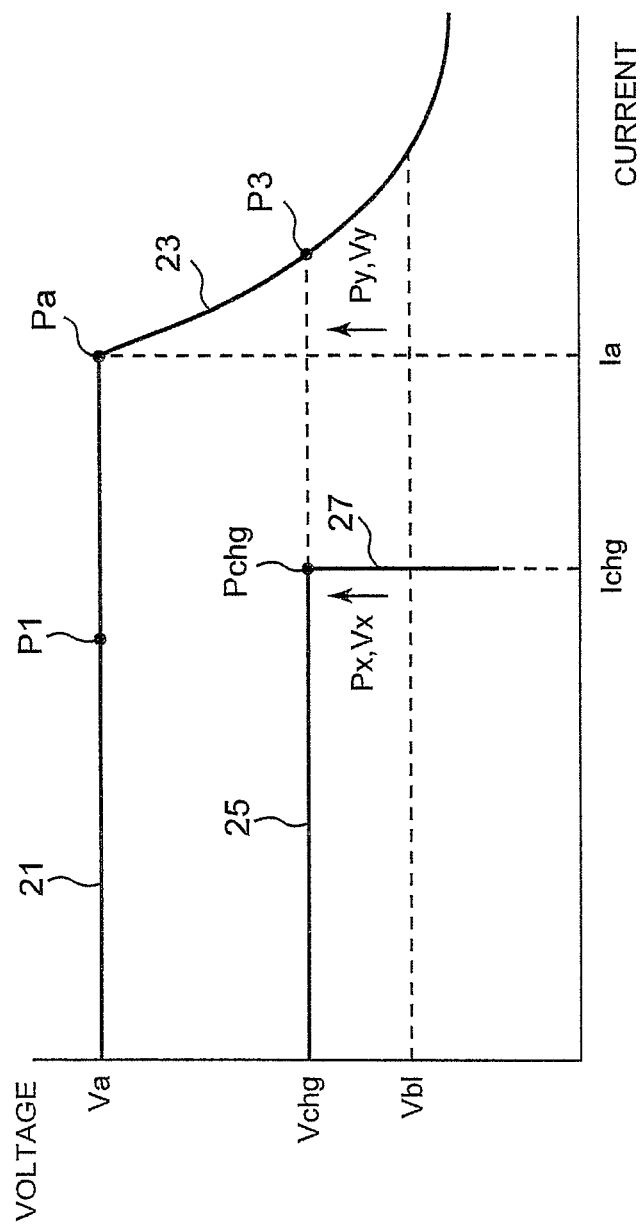
FIG. 2 is a chart for explaining the constant current characteristics of a DC power supply.

The DC power supply 11 of the present invention only needs to be able to charge the rechargeable battery 15 with a current larger than that in the constant current region of the battery charger 17 during the constant current charging period of the rechargeable battery 15 and with a current equal to or smaller than the charging rate of the rechargeable battery 15. Therefore, the DC power supply 11 may have constant power characteristics instead of the constant current characteristics. FIG. 2 illustrates the characteristics of the DC power supply having constant power characteristics. In FIG. 2, the only difference from FIG. 1B is that the DC power supply 11 has a constant power region 24 in a region where the current flows more than the rated current Ia.

In the constant power region 24, the battery charger 17 operates such that the output Po becomes identical to the rated output Pa. Therefore, the charging current Iy increases as the charging voltage Vy decreases. As long as the charging current Iy when the charging voltage Vy decreases the most is equal to or smaller than the charging rate of the rechargeable battery 15, the charging of the rechargeable battery 15 can be performed in a safe manner. The method of using the constant power region 24 in the charging system is the same as the using method of the constant current region 23 previously described. In the constant power region 24, the output Po of the DC power supply 11 becomes identical to the rated power Pa, and the maximum output P3 of the DC power supply 11 during charging is larger than the maximum output P2 of the constant current region 23; therefore, the charging can be completed relatively in shorter time than the DC power supply 11 having the constant current region 23.

Figure 3:
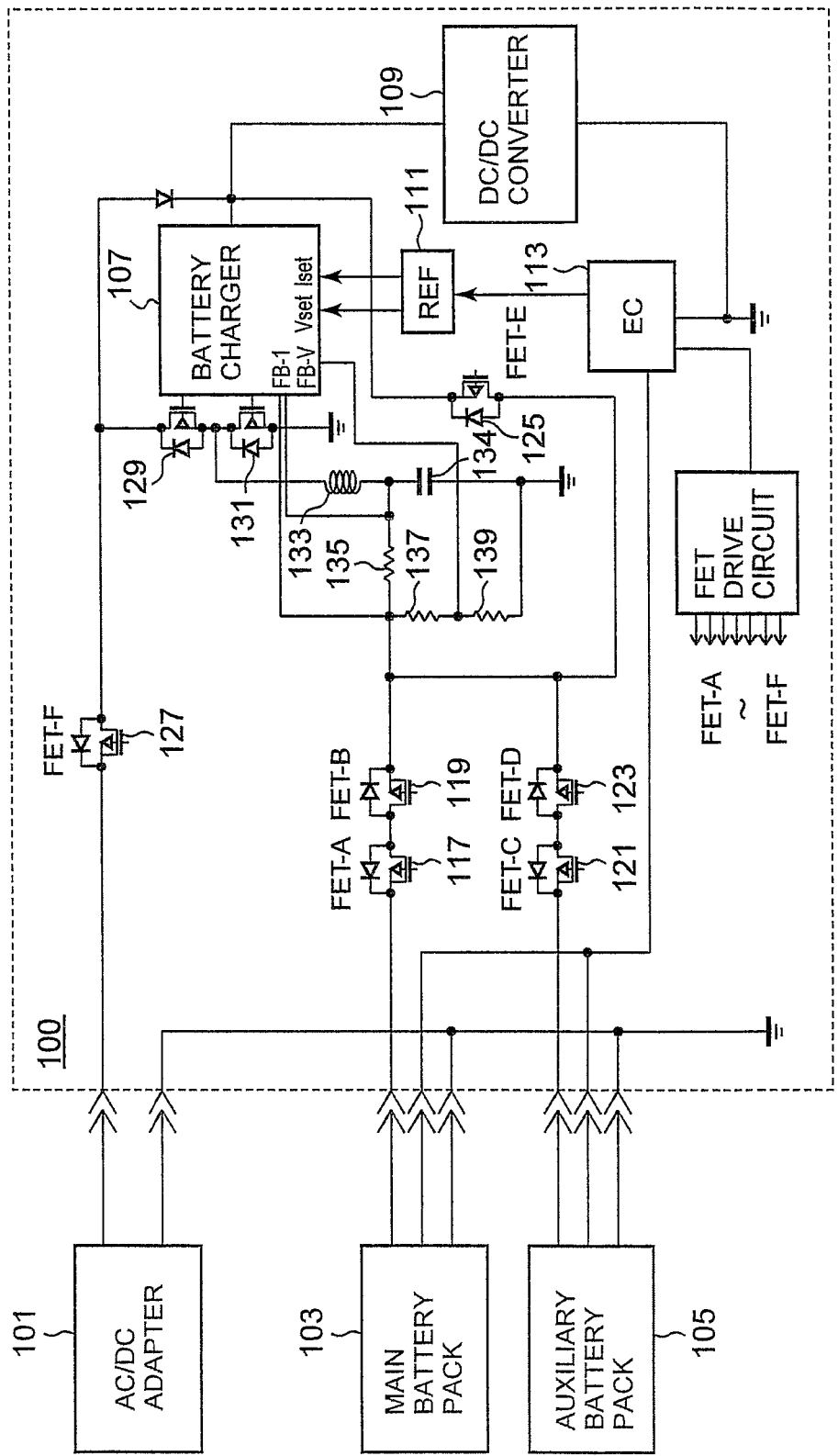
FIG. 3 is a circuit diagram of a battery charging system mounted on a notebook PC, according to an embodiment of the present invention.

FIG. 3 is a block diagram illustrating the construction of a notebook PC 100 in which the charging system described with FIG. 1 is implemented. The notebook PC 100 has a power supply terminal that is connectable with an AC/DC adapter 101 and a battery bay that is attachable to a main battery pack 103 and an auxiliary battery pack 105. The AC/DC adapter 101 is a DC power supply that converts an AC voltage into a predetermined DC voltage. The AC/DC adapter 101 has the same constant-current/constant-voltage characteristics as the DC power supply 11 described with FIG. 1.

The main battery pack 103 and the auxiliary battery pack 105 accommodate therein the fast charge type lithium ion rechargeable battery 15 described with FIG. 1, and have mounted thereon a microprocessor (MPU) that calculates battery voltage, charging current, charging power, and discharging power to periodically delivers them to the notebook PC 100. The main battery pack 103 and the auxiliary battery pack 105 are smart batteries that is compliant with the standards known as smart battery system (SBS), initiated by Duracell Inc. and Intel Inc. During charging and discharging, either selected one of the main battery pack 103 or the auxiliary battery pack 105 is used, and parallel charging or parallel discharging is not carried out. In the description below, the main battery pack 103 and the auxiliary battery pack 105 will be simply referred to as battery packs 103 and 105 when there is no need to distinguish between them.

A power management function of the notebook PC 100 mainly includes an embedded controller (EC) 113 and also includes a battery charger 107 and a DC-DC converter 109. The EC 113 is an integrated circuit that controls many hardware elements of the notebook PC 100 as well as the power supply. The EC 113 can acquire information such as the charging current, charging power, discharging power, and battery voltage generated by the battery pack and the setting voltage and setting current set by the battery charger through communication with the MPU.

The battery charger 107 has constant-current/constant-voltage characteristics similar to the battery charger 17 shown in FIG. 1. Moreover, similar to the battery charger 17, the battery charger 107 is not adapted to charge a fast charge type rechargeable battery having a charging rate of 2 C but is adapted to charge a normal charge type rechargeable battery having a charging rate of 0.7 C. The battery charger 107 includes a switching circuit that controls an FET 129 and an FET 131 in a PWM method and a smoothing circuit composed of an inductor 133 and a capacitor 134. The battery charger 107 suppresses the pulsation of the DC current generated through the switching circuit by using the smoothing circuit, converts a DC voltage input from an AC adaptor 151 into a DC voltage suitable for charging the battery pack in the constant current region or the constant voltage region, and outputs the converted voltage.

The battery charger 107 charges the battery pack by a constant-current/constant-voltage (CCCV) method. To a current setting value input Iset and a voltage setting value input Vset of the battery charger 107, a voltage from a reference voltage source 111, which is divided from a constant voltage generated within the notebook PC 100 is input. The reference voltage source 111 inputs the setting voltage Vchg to the voltage setting value input Vset and the setting current Ichg to the current setting value input Iset in accordance with instructions from the EC 113. To the voltage feedback input FB-V and the current feedback input FB-I of the battery charger 107, outputs from voltage-dividing resistors 137 and 139 and a sense resistor 135 are connected, respectively, and voltages corresponding to the charging voltage Vx and the charging current Ix of the battery charger 107 are input.

The DC/DC converter 109 supplies electric power of a predetermined voltage to a device accommodated in the notebook PC 100, and corresponds to a load that consumes the consumption power Psys shown in FIG. 1. The DC-DC converter 109 converts the DC voltage input from the AC/DC adapter 101 or the DC voltage input from the battery packs 103 and 105 into a predetermined voltage to thereby supply the predetermined voltage to the device within the notebook PC 100. The consumption power of the DC/DC converter 109 varies with the operation state of the notebook PC 100. An FET-A 117 and an FET-B 119 are switches for controlling charging/discharging of the main battery pack 103 and are connected to a charging/discharging circuit of the main battery pack 103. An FET-C 121 and an FET-D 123 are switches for controlling charging/discharging of the auxiliary battery pack 105 and are connected to a charging/discharging circuit of the auxiliary battery pack 105.

An FET-E 125 is a switch that is connected between the battery packs 103 and 105 and the DC/DC converter 109 for selecting either one of a charging mode by the battery charger 107 and a charging mode by the AC/DC adapter 101. The FET-E 125 is also used for supplying electric power from the battery packs 103 and 105 to the DC/DC converter 109. An FET-F 127 is connected to a circuit for supplying electric power from the AC/DC adapter 101 to the DC/DC converter 109. That is, the FET-F 127 is a switch for temporarily supplying electric power from the battery pack to the DC/DC converter 109 in order to perform so-called peak shifting wherein the switch suppresses the peak of an AC power source by interrupting the supply of electric power from the AC power source while electric power is being supplied from the AC/DC adapter 101 to the DC/DC converter 109.

In smart batteries, the charging power and discharging power are measured therein and are periodically delivered to the EC 113. Therefore, when charging is performed by means of the battery charger 107 or the AC/DC adapter 101, the system consumption power Psys for use of the formulas (7) and (8) can be measured by operating a peak shift circuit composed of the FET-F 127, the FET-E 125, and the EC 113 to thereby measure the power discharged from the battery packs 103 and 105 to the DC/DC converter 109. An FET drive circuit 115 controls the FET-A 117 to the FET-F 127 in accordance with instructions from the EC 113.

It is to be understood that FIG. 1 only illustrate the primary hardware constructions related to the present embodiment and the connections in order to describe the present embodiment. In addition to the components described above, many other electric circuits and devices such as a magnetic disk, an optical disk, or a keyboard are employed for the constitution of the notebook PC 100. However, since these are well known to one having ordinary skill in the art, detailed explanations for them will not be provided here. Of course, the blocks shown in FIG. 1 may form a single integrated circuit or device, or one block may be divided into many integrated circuits or devices, and these configurations are also included within the scope of the present invention, so long as one having ordinary skill in the art can arbitrarily select the configurations.

Figure 4:
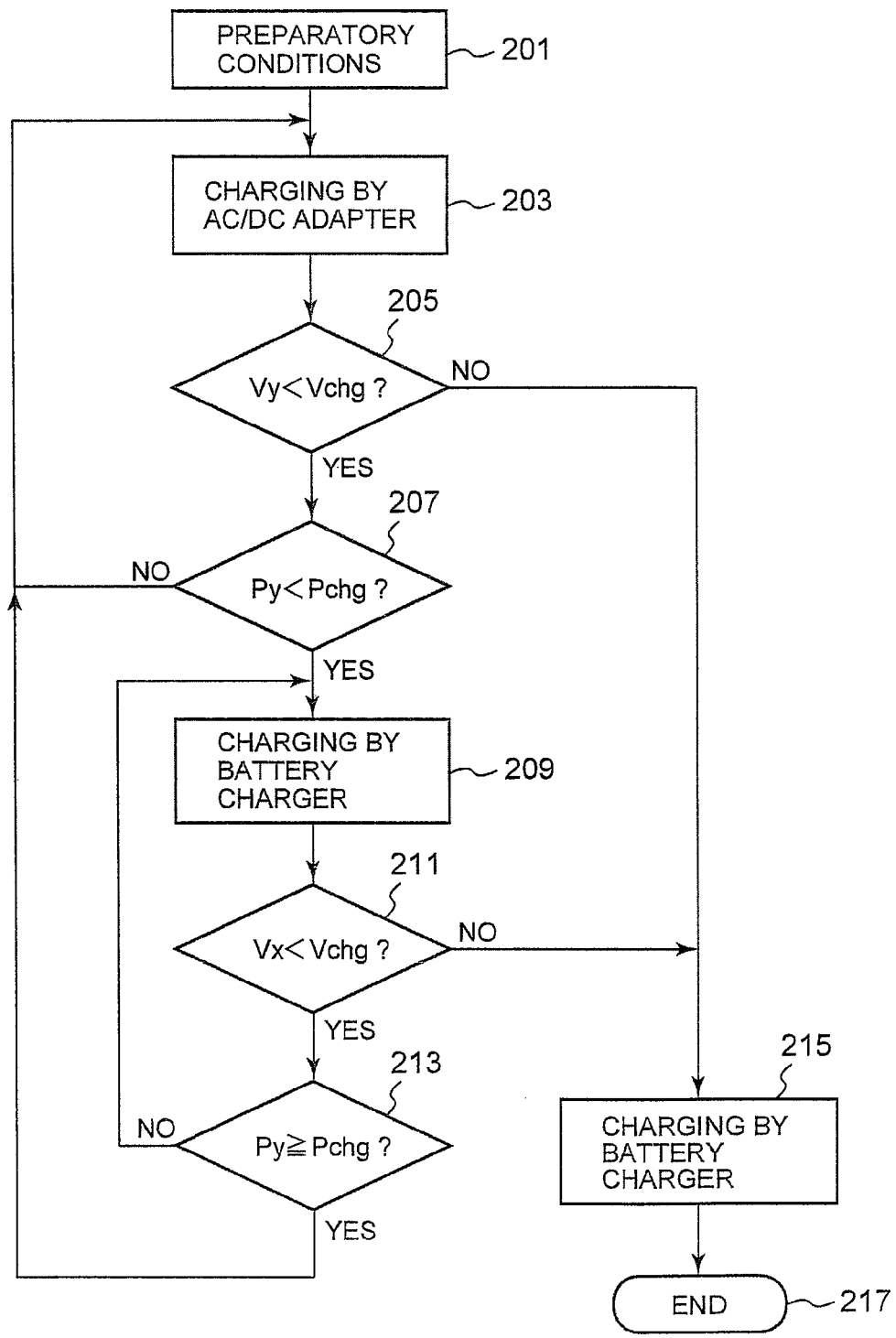
FIG. 4 is a high-level logic flow diagram of a method for charging a rechargeable battery in the battery charging system from FIG. 3.

FIG. 4 is a high-level logic flow diagram for explaining the operation of the charging system shown in FIG. 3. In block 201, preparations for starting the charging of the main battery pack 103 are carried out. The flow chart of FIG. 4 can be similarly referred for understanding the charging of the auxiliary battery pack 105. The FET-A 117, the FET-B 119, and the FET-F 127 are closed, and the FET-C 121, the FET-D 123, and the FET-E 125 are open.

The DC/DC converter 109 allows a wide range of input voltage variation and thus can appropriately operate within the range of the varying output voltage Vo of the AC/DC adapter 101 in implementing the present invention. The consumption power Psys varies depending on the use state of the notebook PC 101. There may be a case where the consumption power Psys is zero depending on the state of the notebook PC. The voltage setting value input Vset and the current setting value input Iset of the battery charger 107 are set to zero, the battery charger 107 is not operating, and the FET 129 and the FET 131 are open.

In block 203, the main battery pack 103 delivers the setting voltage Vchg and the setting current Ichg of the battery charger 107 to the EC 113 to thereby send a request to start charging. When it is confirmed by the EC 113 that the FET-F 127 is closed and that the AC/DC adapter 101 is in a state where it is able to charge while supplying electric power to the DC/DC converter 109, the EC 113 sends a signal that closes the FET-E 125 to the FET drive circuit 115 instead of operating the battery charger 107. When the FET drive circuit 115 closes the FET-E 125 in accordance with instructions from the EC 113, the AC/DC adapter 101 charges the battery pack 103 in the constant current region 23. The EC 113 is periodically informed of the value of the charging power Py from the main battery pack 103.

In block 205, the EC 113 determines whether or not the charging voltage Vy has reached the setting voltage Vchg of the battery charger 107. The value of the charging voltage Vy is periodically delivered from the main battery pack 103 to the EC 113. When the charging voltage Vy has reached the setting voltage Vchg of the battery charger 107, the flow proceeds to block 215, where the EC 113 inputs the setting voltage to the voltage setting value input Vset and the setting current to the current setting value input Iset via the reference voltage source 111 to thereby operate the battery charger 107. The battery charger 107 operates in the constant voltage region 25 to thereby start charging. The EC 113 is periodically informed of the value of the charging current Ix from the main battery pack 103, and when the charging current Ix has decreased to a predetermined value, the flow proceeds to block 217, where the EC 113 sets the voltage setting value input Vset and the current setting value input Iset to zero and stops the battery charger 107 to thereby stop the charging.

In block 205, when the charging voltage Vy is lower than the setting voltage Vchg, the flow proceeds to block 207, where the EC 113 determines whether or not the condition of the formula (3) is satisfied. If the condition of the formula (3) is not satisfied, the flow returns to block 203 and the charging is continued by means of the AC/DC adapter 101. When the condition of the formula (3) is satisfied, the flow proceeds to block 209, where the EC 113 inputs the setting voltage Vchg to the voltage setting value input Vset and the setting current Ichg to the current setting value input Iset to thereby operate the battery charger 107. Moreover, the EC 113 instructs the FET drive circuit 115 to open the FET-E 125. As a result, the main battery pack 103 is charged by means of the battery charger 107. Although the battery charger 107 charges the main battery pack 103 in the constant current region 27, as long as the condition of the formula (3) is satisfied even when the consumption power Psys of the system load increases, the charging can be performed with larger charging current than that provided by the AC/DC adapter 101.

In block 211, the EC 113 determines whether or not the charging voltage Vx has reached the setting voltage Vchg of the battery charger 107. The value of the charging voltage Vx is periodically delivered from the main battery pack 103 to the EC 113. When the charging voltage Vx has reached the setting voltage Vchg of the battery charger 107, the flow proceeds to block 215, where the battery charger 107 transitions to charging in the constant voltage region 25. When it is determined in block 211 that the charging voltage Vx is lower than the setting voltage Vchg, the flow proceeds to block 213, where the EC 113 determines whether or not the condition of the formula (4) is satisfied.

The charging power Py for the case where charging is performed by means of the AC/DC adapter 101, which is needed to determine the condition of the formula (4), can be calculated from the charging voltage Vy measured by the battery pack 103 when the EC 113 temporarily stops the operation of the battery charger 107 and closes the FET-E 125 so that the charging is performed by means of the AC/DC adapter 101. In block 213, when the condition of the formula (4) is not satisfied, the flow returns to block 209 and the charging is continued by means of the battery charger 117. When the condition of the formula (4) is satisfied in block 213, the flow returns to block 203, where the EC 113 stops the operation of the battery charger 107 and closes the FET-E 125 so that the AC/DC adapter 101 charges the battery pack 103.

In blocks 207 and 213, although the charging mode is determined by using the conditions of the formulas (3) and (4), the charging mode may be determined by using the formulas (7) and (8) by operating the peak shift circuit to measure the power consumption Psys of the DC/DC converter 109. In the procedure described above, it has been described that the charging is first performed by means of the AC/DC adapter 203 in block 203. However, the charging may be started by means of the battery charger 117 since the superiority of the charging mode is evaluated in blocks 207 and 213, where it is determined as to whether one charging mode is superior to the other charging mode while the charging is performed in either charging mode. Moreover, depending on the operation state of the notebook PC 100, the consumption power Psys of the DC/DC converter 109 varies frequently. Therefore, when the flow proceeds from block 207 to block 209 or from block 213 to block 203, it is preferable that the threshold values for the transitions are different from each other. Furthermore, if the charging has been started in either charging mode, it is preferable to maintain the charging mode for a predetermined period of time even when the condition for changing the charging mode is satisfied in blocks 207 or 213.

In FIG. 2, the battery packs 103 and 105 were described by way of an example of a smart battery; however, the present invention can be applied when charging a battery pack without an internal processor mounted thereon. In such a case, the charging power or the charging voltage is measured in a main body of the notebook PC 100. In the present invention, the determination as to whether or not to change the charging mode may be made based on a unique operation mode related to the load consumption power as well as by use of the current value or the power value. For example, the notebook PC 100 has an operation mode which includes a normal state, a suspend state, a standby state, a hibernation state, and a power-off state, as defined in a specification called ACPI (Advanced Configuration and Power Interface). In a power-off state, electric power is supplied to only the minimally necessary circuits for reactivating the power of the notebook PC 100 or controlling the charging by the AC/DC adapter 101, and electric power is not supplied to other loads.

In a hibernation state, the contents stored in the RAM or register before the supply of electric power is stopped are written to a magnetic disk drive, and the power supply enters a state substantially the same as the power-off state. In a standby state, a VGA signal of a display is off, and the frequency of a processor is decreased or throttled so that the power consumption of the processor is decreased. In a suspend state, since it is necessary that the stored operation state content in a memory is maintained, electric power is supplied to only necessary circuits for reactivation and storage maintenance of the memory. In a normal operation state, the power supply is configured so that electric power is supplied to the entire system loads, and the actual power consumption of the system loads varies with the operation state.

The notebook PC 100 transitions between the operation modes in accordance with event information related to the length of time where a user's operation or access is not made and detection of radio wave from wireless LAN or the like, whereby it can save the power consumption and maintain convenience. In the suspend state, standby state, hibernation state, and power-off state, it is obvious that the load power consumption Psys is small and charging with the AC/DC adapter 101 provides higher charging rate. Therefore, upon receipt of an event wherein the notebook PC enters either one of such operation states, the EC 113 controls the charging system so that the charging is performed by means of the AC/DC adapter 101. Meanwhile, upon receipt of an event wherein the notebook PC enters the normal operation state, the EC 113 controls the charging system so that the charging is performed by means of the battery charger 107. The program for causing the EC 113 to execute the procedures shown in FIG. 4 is stored in a flash memory provided inside the EC 113.

Figure 5:
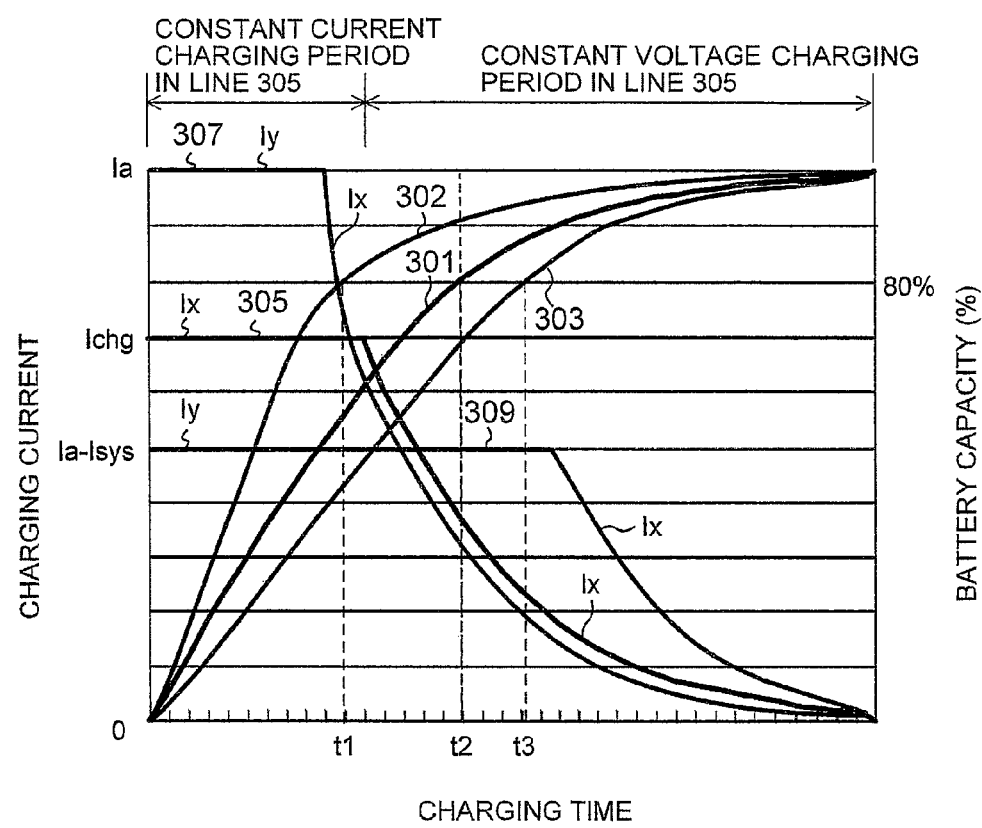
FIG. 5 is a chart for explaining the charging time when the battery charging system from FIG. 3 charges a rechargeable battery.

FIG. 5 is a diagram for explaining the charging characteristics when the charging system of FIG. 3 charges the main battery pack 103. In the drawing, lines 301, 302, and 303 depict changes in the charging time and the charge capacity when the full charge capacity is regarded as 100%. A line 305 corresponds to the line 301 and depicts the charging current Ix when the rechargeable battery 15 completely discharged is charged only by means of the battery charger 107 over a period from the constant current charging period to the constant voltage charging period. In this case, the time taken until the charge capacity, which is the energy charged in the rechargeable battery 15, reaches 80% of the full charge capacity is t2. A line 307 corresponds to the line 302 and depicts the charging current Iy and Ix when the rechargeable battery 15 is charged by means of the AC/DC adapter 101 in the constant current charging period, and when the rechargeable battery 15 is charged by means of the battery charger 107 in the constant voltage charging period after the charging voltage Vy has reached the setting voltage Vchg, in a state where the consumption power of the DC/DC converter 109 is zero.

Since the consumption power of the DC/DC converter 109 is zero, the AC/DC adapter 101 can supply the whole rated current Ia to the rechargeable battery 15. In this case, the time taken until the charge capacity, which is the energy charged in the rechargeable battery 15, reaches 80% of the full charge capacity is t1; therefore, it is possible to shorten the charging time by 30% of the time t2. A line 309 corresponds to the line 303 and depicts the charging current Iy and Ix when the rechargeable battery 15 is charged by means of the AC/DC adapter 101 in the constant current charging period, and when the rechargeable battery 15 is charged by means of the battery charger 107 in the constant voltage charging period after the charging voltage Vy has reached the setting voltage Vchg, in a state where the DC/DC converter 109 consumes a predetermined power.

In the case of the line 309, since a load current Isys flows in the DC/DC converter 109, the charging current Iy flowing in the rechargeable battery 15 amounts to Ia−Isys. In this state, since the consumption power of the DC/DC converter 109 is large and the condition of Iy<Ichg (i.e., Py<Pchg) is satisfied, the time taken until the charge capacity, which is the energy charged in the rechargeable battery 15, reaches 80% of the full charge capacity is t3 (t3≥t2). Therefore, when the consumption power of the DC/DC converter 109 has increased and exceeded a predetermined value, the charging is performed by means of the battery charger 107 in the constant current charging period in order to shorten the charging time.

As has been described, the present invention provides a method for reducing charging time of a battery having a charging rate greater than the capacity of a battery charger.

It is also important to note that although the present invention has been described in the context of a fully functional battery charging system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A battery charging system comprising:
   a battery charger;
   a DC power supply;
   a load coupled to said DC power supply;
   a first switch coupled between said DC power supply and said battery charger coupled to a rechargeable battery to be recharged;
   a second switch coupled between said DC power supply and said rechargeable battery; and
   a control circuit for selectively switching between a first charging mode by closing said first switch and opening said second switch, during which said battery charger charges said rechargeable battery while said DC power supply supplies electric power to said battery charger and to said load, and a second charging mode by opening said first switch and closing said second switch, during which said DC power supply charges said rechargeable battery while supplying electric power to said load.

2. The battery charging system of claim 1, wherein said control circuit controls said switching according to a comparison result between a charging voltage delivered by said DC power supply and a setting voltage of said battery charger.

3. The battery charging system of claim 2, wherein said control circuit controls said switching further according to a comparison result between a charging power and a setting power of said battery charger.

4. The battery charging system of claim 1, wherein during said second charging mode, said DC power supply charges said rechargeable battery with a constant current.

5. The battery charging system of claim 1, wherein during said second charging mode, said DC power supply charges said rechargeable battery with a constant power.

6. The battery charging system of claim 1, wherein during said first charging mode, said battery charger charges said rechargeable battery with a constant voltage.

7. A portable computer comprising:
   a battery charger;
   an AC/DC adapter;
   a first transistor coupled between said AC/DC adapter and said battery charger coupled to a rechargeable battery to be recharged;
   a second transistor coupled between said AC/DC adapter and said rechargeable battery; and
   an embedded control circuit for selectively switching between a first charging mode by closing said first transistor and opening said second transistor, during which said battery charger charges said rechargeable battery pack while said AC/DC adapter supplies electric power to said battery charger and to said portable computer, and a second charging mode by opening said first transistor and closing said second transistor, during which said AC/DC adapter charges said rechargeable battery pack and supplies electric power to said portable computer.

8. The portable computer of claim 7, wherein said embedded control circuit controls said switching according to a comparison result between a charging voltage delivered by said AC/DC adapter and a setting voltage of said battery charger.

9. The portable computer of claim 7, wherein said embedded control circuit controls said switching according to a comparison result between a charging power and a setting power of said battery charger.

10. The portable computer of claim 7, wherein during said second charging mode, said AC/DC adapter charges said rechargeable battery with a constant current.

11. The portable computer of claim 7, wherein during said first charging mode, said battery charger charges said rechargeable battery with a constant voltage.

* * * * *